US006188271B1

(12) United States Patent
Wang et al.

(10) Patent No.: US 6,188,271 B1
(45) Date of Patent: Feb. 13, 2001

(54) FAIL SAFE BIAS SYSTEM FOR A TRI-STATE BUS

(76) Inventors: Minhui Wang, 734 Great Bend Dr., Diamond Bar, CA (US) 91765; Dean A. Wallace, 19110 Sycamore Glen Dr., Trabuco Canyon, CA (US) 92679

( * ) Notice: Under 35 U.S.C. 154(b), the term of this patent shall be extended for 0 days.

(21) Appl. No.: 09/114,631

(22) Filed: Jul. 13, 1998

(51) Int. Cl.[7] ............................................. G05F 1/10
(52) U.S. Cl. .................................. 327/545; 327/530
(58) Field of Search ............................... 327/65, 545, 530, 327/63, 323, 306; 326/56, 57, 86

(56) References Cited

U.S. PATENT DOCUMENTS

| | | | |
|---|---|---|---|
| 4,748,426 | 5/1988 | Stewart | 333/22 R |
| 5,179,293 | * 1/1993 | Hilton | 326/56 |
| 5,239,658 | 8/1993 | Yamamuro et al. | 395/800 |
| 5,272,396 | 12/1993 | Mammano et al. | 307/443 |
| 5,485,488 | * 1/1996 | Van Brunt et al. | 375/257 |
| 5,510,727 | 4/1996 | Culmer et al. | 326/30 |
| 5,585,741 | 12/1996 | Jordan | 326/30 |
| 5,635,852 | 6/1997 | Wallace | 326/30 |
| 5,781,028 | * 7/1998 | Decuir | 326/30 |

FOREIGN PATENT DOCUMENTS

| | | |
|---|---|---|
| 0341841A3 | 11/1989 | (EP) . |
| 0531630A1 | 3/1993 | (EP) . |
| WO9529532 | 11/1995 | (WO) . |

OTHER PUBLICATIONS

Scherer, "SCSI Active Termination", 2420 *Elektor Electronics*, vol. 19, No. 213, Jul./Aug. 1993.
Urban, et al., "Choosing Proper Terminators For The SCSI–Bus System Environment", 2328 *Electronic Design*, vol. 41, No. 6, pp. 87, 88, 90, 94 and 96, Mar. 18, 1993.

\* cited by examiner

*Primary Examiner*—Jung Ho Kim
(74) *Attorney, Agent, or Firm*—Knobbe, Martens, Olson & Bear, LLP

(57) ABSTRACT

A Norton equivalent implementation of a fail safe bias circuit drives a bus to provide a stable bias voltage which is not affected by an output impedance of a current source. The Norton equivalent implementation has first current source, a bias resistor and a current sink in series. The bias resistor is connected across a pair of differential bus lines so that the current flowing through the bias resistor causes a bias voltage to be generated between the bus lines. The current to the bias resistor is selectively switched on and off to control the bias voltage so that the bias voltage can be turned off during high speed data transfers on the bus.

42 Claims, 5 Drawing Sheets

FAIL SAFE BIAS SYSTEM FOR A TRI-STATE BUS

BACKGROUND OF THE INVENTION

1. Field of the Invention

The present invention relates to a differential terminator which provides a fail safe bias for a bus having tri-state drivers, and, more particularly, the present invention is directed to a method and apparatus which uses current sources to provide fail safe bias voltages to the bus.

2. Background

In a computer system, various subsystems must communicate with each other. For instance, a memory subsystem and a central processor unit (CPU) subsystem exchange data. Similarly, the CPU subsystem exchanges data with I/O subsystems. Data exchanges within a computer system are commonly performed using one or more buses. In particular, a typical bus can be advantageously used as a shared communication link between subsystems. That is, multiple subsystems can transfer data on the bus at different times by applying signals to the bus which can be received by other subsystems on the bus.

When multiple subsystems share the same bus, only one subsystem generally applies signals to the bus at any particular time, and during that time, the other subsystems do not apply signals to the bus. Thus, although the other subsystems are connected to the shared bus, the bus transmitters (i.e., drivers) associated with the other subsystems are disabled such that only the bus transmitters associated with the subsystem applying signals to the bus are active.

A number of techniques can be used to implement a shared bus system. For example, the subsystems can use open-collector drivers or tri-state drivers. The present invention will be described below in connection with buses wherein the subsystems have transmitters which are tri-state drivers. Briefly, tri-state drivers have an enabled state and a disabled state. When a tri-state driver is enabled, the tri-state driver can apply a signal to a bus having a first drive level (e.g., a signal level corresponding to a logical one) or a second drive level (e.g., a signal level corresponding to a logical zero). Depending upon the type of bus, the first and second drive levels may be voltage levels with respect to a reference voltage (e.g., a logical one represented by a relatively high voltage with respect to logic ground and a logical zero represented by a relatively low voltage with respect to logic ground), or the first and second drive levels may be differential voltages between two driver outputs wherein the first drive level may be a differential voltage of a first relative polarity between the two driver outputs and the second drive level may be a differential voltage of a second relative polarity between the two driver outputs. When a tri-state driver is in a disabled state, the tri-state driver has substantially no effect on the bus. That is, the outputs of the disabled tri-state driver are effectively disconnected from the bus or are connected to the bus via very high impedances.

When data are being transferred on a shared bus, the various control and signal lines on the bus will have known states determined by the enabled tri-state drivers of the particular subsystem currently controlling the bus. However, when no subsystem is controlling the bus and no tri-state drivers are driving the various lines of the bus, the voltage levels on the control and signal lines of the bus may be unknown. For example, in an exemplary small computer systems interface (SCSI) bus, the protocol for controlling the SCSI bus includes a bus idle state wherein certain control and signal lines on the bus are not being driven by any subsystem connected to the SCSI bus. In other words, during the bus idle state, the control and signal lines are "floating" (i.e., the voltage levels on the lines or the relative voltages between differential lines are indeterminate).

Because the bus control and signal lines are floating during the bus idle state, noise may then make the bus more susceptible to a false transition where a receiver will perceive the noise as an assertion or deassertion of a control line, for example.

It is known to add bus terminators to the control and signal lines of a bus, such as a SCSI bus. Such terminators provide a fail safe bias which sets the voltage levels on the bus to a known state. A conventional way to provide a fail safe bias for differential signal buses is to use a three-resistor stack or voltage divider, as illustrated in FIG. 1. The three resistors $R_1$, $R_2$, $R_3$ are connected in series between the highest (i.e., most positive) supply voltage and the lowest (e.g., logic ground or most negative) supply voltage. The fail safe bias voltage is provided by the voltage drop across the center resistor $R_2$.

A disadvantage of generating the fail safe bias across the center resistor $R_2$ is that the voltage across the center resistor $R_2$ is directly related to source voltage Vcc (i.e., the most positive supply voltage with respect to the most negative supply voltage or ground). Because the voltage across the center resistor $R_2$ varies as Vcc changes, the bus is highly susceptible to noise from various devices connected to the bus. In addition, the fail safe bias resistors affect the equivalent output impedance of the terminator, hence further degrading the performance of the bus. Another disadvantage is that the conventional fail safe bias is not switchable (i.e., cannot be turned on and off) as a function of the transmission rate of the bus. This has been found by the inventors herein to be a problem because loading of the bus caused by the termination resistors may preclude high-speed operation of the bus.

SUMMARY OF THE INVENTION

The present invention provides a fail safe bias voltage for a bus which is not affected by the output impedance of a current source. The present invention also provides a fail safe bias which can be easily switched in and out depending on the transmission rate of the bus.

One embodiment of the present invention comprises a current source. A first resistor and a second resistor are connected in series between the current source and a current sink. The series connection of the two resistors is connected across a pair of differential bus lines to provide a passive termination impedance. A first switch electrically connects the current source to the first resistor and a second switch electrically connects the current sink to the second resistor.

When the first switch and the second switch are closed, current flows through the series connection of the two resistors to provide a bias voltage between the differential bus lines. The bias voltage is generated between first and second nodes. The first node is located between the current source and the first resistor.

The current source is switched to the first node. The second node is located between the current sink and the second resistor. The current sink is switched to the second node. A third node is located at a common connection between the first and second resistors. Preferably, a third bias impedance (e.g., a third resistor) is connected between the third node and a voltage source which provides a common mode bias voltage to the differential bus lines.

In another embodiment, a fail safe bias circuit selectively provides a bias voltage to a bus having a first signal line and a second signal line. The fail safe bias circuit comprises at least one resistor connected between the first signal line and the second signal line, a current source and a first switch interposed between the current source and the first signal line. The fail safe bias circuit further comprises a current sink; and a second switch which is connected between the current sink and the second signal line.

The first switch and the second switch are operable in respective first states to enable current to flow from the current source via the resistor to the current sink so as to generate a bias voltage between the first signal line and the second signal line. The first switch and the second switch are also operable in respective second states to interrupt current flow from the current source through the resistor.

In another embodiment, the resistor comprises a first resistor and a second resistor having substantially equal resistances. In yet another embodiment, the first switch and the second switches are metal oxide semiconductor field effect transistor switches.

In another embodiment, a fail safe bias circuit generates a desired bias voltage between a pair of differential signal lines of a bus. The fails safe bias circuit comprises at least one resistance connected between the two signal lines and a current source which generates a current having a magnitude selected to be substantially equal to the desired bias voltage divided by the resistance. The fail safe bias circuit further comprises a current sink which receives the current from the current source via the resistance.

In addition, a first switch is disposed between the current source and the resistance and a second switch is disposed between the current sink and the resistance. The first and second switches switching between an on state in which current flows from the current source to the current sink through the resistance and an off state in which the current source and the current sink are disconnected from the resistance. The first switch and the second switch change from the on state to the off state and from the off state to the on state in response to a change in a condition of the bus.

In another embodiment, the change in condition of the bus is related to the transmission rate on the bus. In yet another embodiment, the change in condition of the bus is related to the differential voltage on the bus. In still another embodiment, the change in condition of the bus relates to the state of a control signal generated by at least one device attached to the bus.

In another embodiment, the change in condition of the bus comprises a logical combination of at least one control signal from a plurality of devices secured to the bus. In yet another embodiment, the control signal is generated by any device attached to the bus communicating on the bus at a frequency above a threshold. In still another embodiment, the control signal is generated by each device attached to the bus communicating at a frequency below the threshold.

In another embodiment, a fail safe bias circuit generates a bias voltage and has a resistance substantially equal to the impedance of the bus. The fail safe bias circuit comprises a means for sourcing a current, a means responsive to the current for generating the bias voltage, a means for sinking the current; and a means for selecting interrupting current flow to the means for generating the bias voltage.

In another embodiment, an apparatus for selectively providing a bias voltage to a bus has a first signal line and a second signal line. The apparatus comprises at least a first switch interposed between a current source and a first signal line, and at least a second switch connected between a current sink and a second signal line, wherein the first and second switches are selectively switched to generate a bias voltage between the first signal line and the second signal line.

In another embodiment, the first and second signal lines operate in at least a first transfer mode and a second transfer mode. The first and second switches configured to generate the bias voltage during the first transfer mode but not during the second transfer mode. In yet another embodiment, the first transfer mode is configured to transfer control signals. In still another embodiment, the first transfer mode is configured to transfer messages.

In another embodiment, the first transfer mode transfers data at a slower rate than the second transfer mode. In yet another embodiment, the second transfer mode is configured to transmit data signals. In still another embodiment, the first and second signal lines comprise a bus.

In another embodiment, the first and second switches are selectively switched to generate a bias voltage between the first signal line and the second signal line based on the transmission rate of the bus. In yet another embodiment, the bus is a computer bus. In still another embodiment, the bus is a small computer system interface bus.

In another embodiment, the apparatus further comprises a source device which is connected to the first and second signal lines. In other embodiments, the source device is a processor, a computer system, a storage device, a printer, network interface circuitry, or the like.

In another embodiment, the apparatus further comprises a destination device which is connected to the first and second signal lines. In other embodiments, the destination device is a processor, a computer system. The apparatus of claim 22 wherein the destination device is an external storage device, a printer, network interface circuitry.

In another embodiment a method of selectively providing a bias voltage to a bus comprises the acts of selectively switching a current source to a first signal line; selectively switching a current sink to a second signal line, wherein the first and second signal lines operate in at least two transfer modes; and controlling the acts of selectively switching to generate a bias voltage between the first signal line and the second signal line when transmitting signals on the first and second signal lines.

In another embodiment, the act of controlling generates the bias voltage in at least a first transfer mode and does not generate the bias voltage during a second transfer mode. In yet another embodiment, the act of controlling generates the bias voltage when the first and second signal lines transmit control signals. In still another embodiment, the act of controlling generates the bias voltage when the first and second signal lines transmit message signals.

In another embodiment, the act of controlling generates the bias voltage when the first and second signal lines are not driven by bus transmitters. In still another embodiment, the act of controlling generates a bias voltage between the first signal line and the second signal line in response to the transmission rate of the signals on the first and second signal lines.

In another embodiment, the method comprises the act of transmitting the signals to a source device when the bias voltage exists between the first and second signal lines. In yet another embodiment, the method comprises the act of transmitting the signals to a computer processor when the bias voltage exists between the first and second signal lines. In still another embodiment, the method comprises the act of transmitting the signals to a storage device when the bias voltage exists between the first and second signal lines.

In another embodiment, the method comprises the act of transmitting the signals to a printer when the bias voltage exists between the first and second signal lines. In yet another embodiment, the method comprises the act of transmitting the signals to a network interface circuitry when the bias voltage exists between the first and second signal lines. In another embodiment, the method comprises the act of receiving the signals at a destination device when the bias voltage exists between the first and second signal lines.

These and other aspects, features and advantages of the present invention will be better understood by studying the detailed description in conjunction with the drawings and the accompanying claims.

BRIEF DESCRIPTION OF THE DRAWINGS

A detailed description of embodiments of the present invention will be made with reference to the accompanying drawings, wherein like numerals designate corresponding parts in the several figures, and in which.

DETAILED DESCRIPTION

Figure 1:
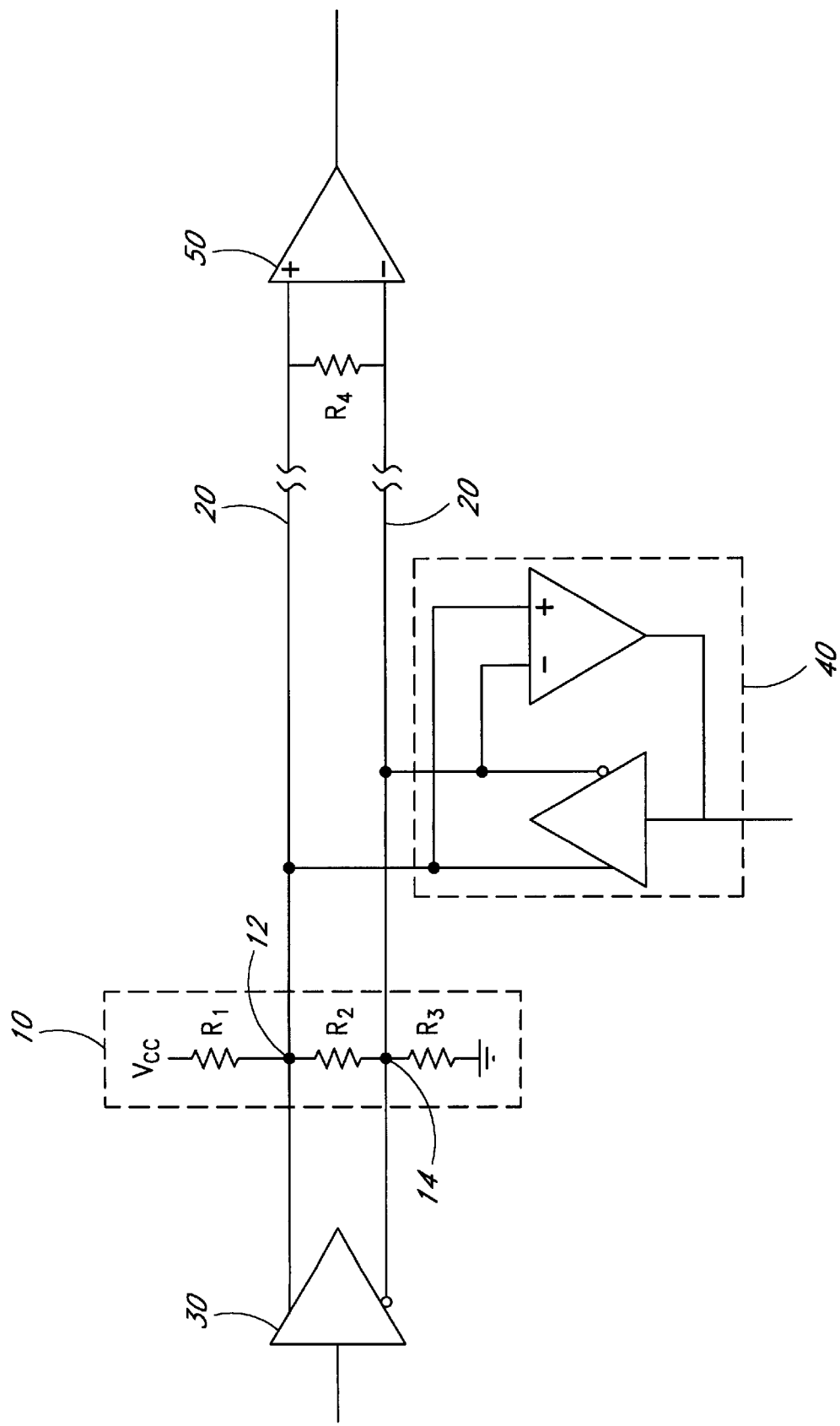
FIG. 1 is a prior art circuit for providing a fail safe bias voltage.

FIG. 1 illustrates an exemplary prior art circuit 10 which provides a bias voltage to a bus 20, such as, for example, a SCSI differential bus. The invention will be described below in terms of the differential signal lines for a single signal, such as for example, a data signal or a control signal on an exemplary bus. It should be understood that the pair of lines comprising the bus 20 in FIGS. 1–5 represents one pair of a plurality of differential signal line pairs for the data and control lines in the exemplary bus.

The bus 20 is driven by a tri-state driver 30 and provides signals to a receiver 50. Additional drivers and receivers, represented by a plurality of peripheral circuits 40, may also be connected to the bus 20. Each of the drivers in the peripheral circuits 40 is also a tri-state driver. The driver 20, the receiver 50 and the plurality of peripheral circuits 40 provide communication links between internal and external devices connected to the bus 20. For example, a portion of the bus 20 may be internal to computer system (not shown), and a portion of the bus 20 may be connected to external devices (e.g., a scanner, an external storage device, or the like).

The fail safe bias circuit 10 of FIG. 1 comprises first, second and third resistors, $R_1$, $R_2$ and $R_3$, connected in series between Vcc and ground where Vcc is a relatively positive supply voltage and ground is a logical ground. It should be understood of course that in some applications, Vcc may be a relatively negative voltage with respect to ground, and in other applications, the ground connection may be replaced with a connection to a relatively negative voltage.

As illustrated in FIG. 1, a resistor $R_4$ is connected in parallel with the resistor $R_2$ to provide a termination at the other end of the bus 20. It should be understood that the resistor $R_4$ could be replaced by a three-resistor stack similar to the resistors $R_1$, $R_2$ and $R_3$. The bias circuit 10 provides a line voltage, also known as fail safe bias voltage, across the center resistor $R_2$ between a first node 12 and a second node 14. The magnitude of the fail safe bias voltage $V_{fsb}$ can be calculated as follows:

$$V_{fsb}=Vcc\times(R_2\|R_4)/[R_1+R_3+(R_2\|R_4)]=Vcc\times R_2/[R_1+R_3+R_2] \text{ when no load (i.e., when } R_4=\infty\text{),} \quad [1]$$

in which the symbol "$\|$" between resistors denotes the resistance of the identified resistors connected in parallel.

The equivalent output impedance, $R_{eq}$, is determined with no load (i.e., when eq, $R_4$ is not present), and is equal to:

$$R_{eq}=R_2\|(R_1+R_3) \quad [2]$$

As shown in the bias voltage equation (Equation 1), the bias voltage $V_{fsb}$ is directly related to Vcc and hence varies as Vcc varies due to voltage fluctuations intrinsic to DC converters and also caused by battery and temperature variations.

In accordance with the present invention, and as described hereinafter in connection with FIGS. 2–4, the above-described problems with the known bias circuit are solved by utilizing a switched "Norton Equivalent" implementation to provide a novel circuit to perform the fail safe bias function.

As described above, the disadvantage of the previously known technique is that the fail safe bias is directly related to source voltage Vcc and therefore varies as Vcc changes. This makes the bus highly susceptible to the noise from various devices connected to the bus which may cause noise on the source voltage Vcc. This can be better understood by referring to FIG. 2 which illustrates an Thevenin-like equivalent circuit 10' of the fail safe bias circuit 10 of FIG. 1.

Figure 2:
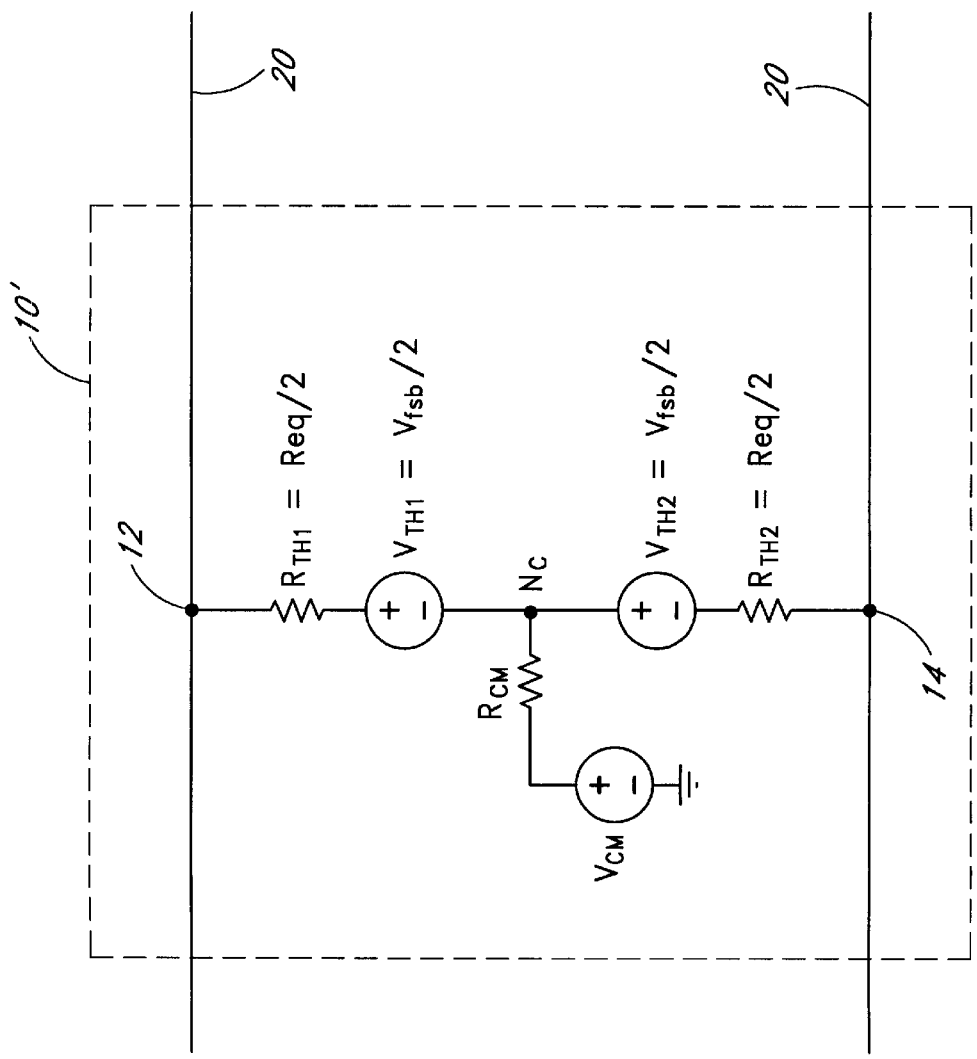
FIG. 2 is a schematic diagram of a Thevenin-like implementation of the fail safe bias circuit of FIG. 1.

As represented in FIG. 2, the bias circuit 10' comprises a first Thevenin equivalent resistance $R_{Th1}$ which is interposed between a common node $N_C$ and the first node 12. A second Thevenin equivalent resistance $R_{Th2}$ is interposed between the common node $N_C$ and the second node 14. Each of the resistances $R_{Th1}$ and $R_{Th2}$ is equal to $R_{eq}/2$ As described above, $R_{eq}$ is the resistance with the load resistor $R_4$ set to infinity (i.e., removed) which is calculated by Equation 2.

In FIG. 2, one-half the fail safe voltage $V_{fsb}$ (i.e., $V_{fsb}/2$) is connected in series with the resistance $R_{Th1}$ between the common node $N_C$ and the first node 12, and one-half the fail safe voltage is connected in series with the resistance $R_{Th2}$ between the common node $N_C$ and the second node 14. Thus, it can be seen that the impedance between the two nodes 12, 14 in FIG. 2 is equal to $R_{eq}$ as would be measured across the nodes 12, 14 in FIG. 2. In addition, the voltage across the nodes 12, 14 in FIG. 2 is equal to $V_{fsb}$ as would be measured across the two nodes 12, 14 in FIG. 1.

It should be understood from FIG. 1, that the fail safe bias circuit 10 is referenced to ground. Thus, in addition to the bias voltage across the nodes 12 and 14, an offset or common-mode voltage is present on the two nodes 12, 14. This is represented by an common-mode voltage source $V_{cm}$ which is interposed between the common node $N_C$ and ground. In addition, because each of the nodes 12, 14 is referenced to ground through the fail safe bias circuit 10, a common-mode resistance $R_{cm}$ is connected in series with the common-mode voltage source $V_{cm}$ between the common node $N_C$ and ground. The voltage of the common-mode voltage source $V_{cm}$ and the resistance of the common-mode resistance $R_{cm}$ can be readily determined by Thevenin-like calculations.

From FIG. 2, it can be readily seen that the fail safe bias voltage across the two nodes 12, 14 is highly dependent upon the supply voltage Vcc. Furthermore, the voltage sources $V_{Th1}$ and $V_{Th2}$ are in the bias circuit are present at all times. This has been found to be a disadvantage in certain high speed data transfer applications.

By representing the fail safe bias circuit 10' as illustrated in FIG. 2, it can be seen that a Thevenin equivalent resistance and a Thevenin equivalent voltage source is connected between the common node $N_C$ and each of the nodes 12, 14. As discussed below, the Thevenin equivalent resistances and voltages can be changed to their respective Norton equivalents to overcome the disadvantages of the conventional fail safe bias circuit 10 of FIG. 1.

Figure 3:
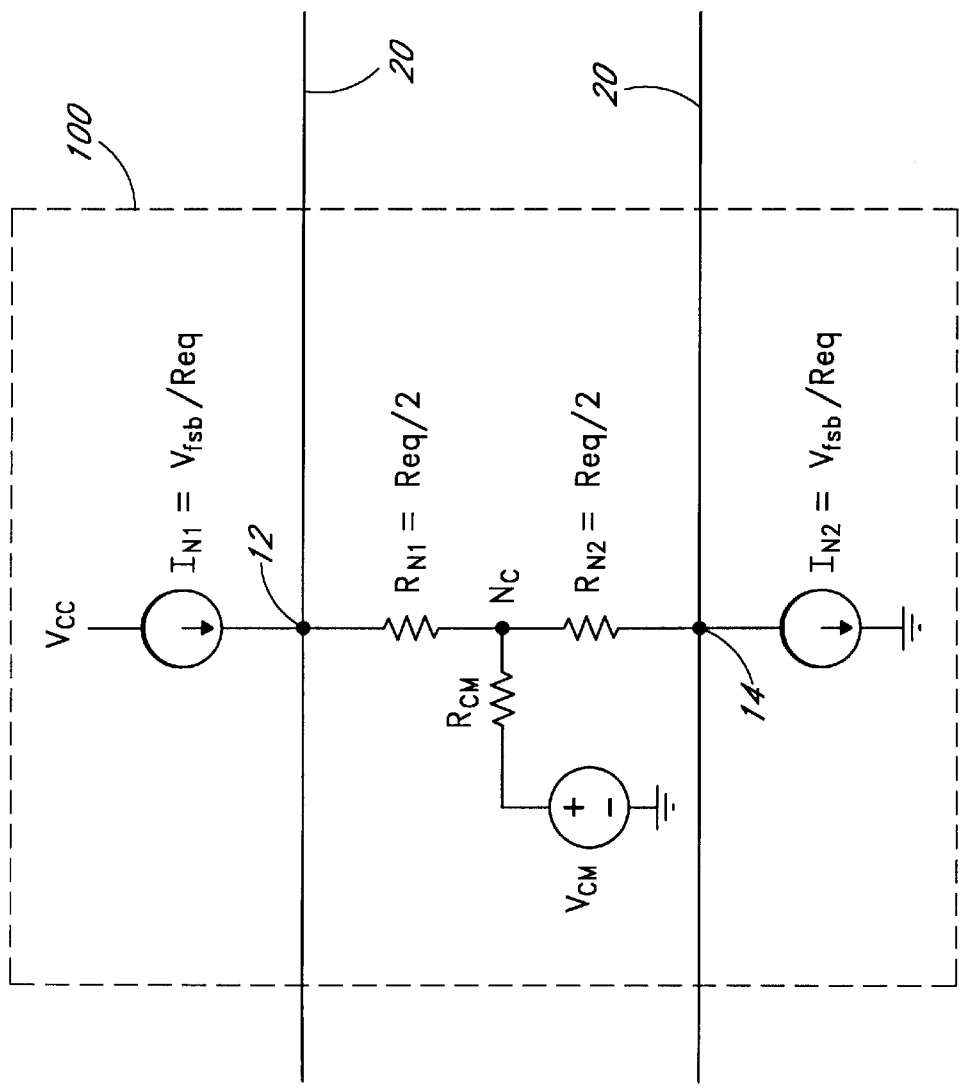
FIG. 3 is a schematic diagram of a Norton implementation of the fail safe bias circuit of FIG. 2.

FIG. 3 is a schematic diagram of FIG. 2 using a Norton equivalent implementation 100 of the fail safe circuit. The Norton implementation circuit 100 of FIG. 3 is similar in some aspects to the circuit of FIG. 2, and like components are therefore similarly labeled. The Norton implementation circuit 100 comprises a current source $1_{N1}$ connected between Vcc and the first node 12. A first Norton equivalent resistor $R_{N1}$ is connected between the first node 12 and the common node $N_C$. A second Norton equivalent resistor $R_{N2}$ is connected between the common node $N_C$ and the second node 14. A current sink $1_{N2}$ is connected between the second node 14 and ground. The common node $N_C$ is connected to ground via the common mode resistance $R_{cm}$ and the common mode voltage $V_{cm}$, as discussed above in connection with FIG. 2.

The circuit 100 provides a bias voltage to the nodes 12 and 14, as will be discussed below. The values of $I_{N1}$, $I_{N2}$, $R_{N1}$ and $R_{N2}$ are calculated as follows:

$I_{N1}=(V_{fsb}/2)/(R_{eq}/2)=V_{fsb}/R_{eq}$ $I_{N2}=V_{fsb}/R_{eq}$ $R_{N1}=R_{eq}/2$ and $R_{N2}=R_{eq}/2$.

The bus lines 20 are connected to the equivalent circuit 100 at the nodes 12 and 14, as before.

In one embodiment, the current source $I_{N1}$ and sink $I_{N2}$ in the Norton implementation circuit 100 are preferably temperature compensated constant current sources or their equivalents. The current source $I_{N1}$ and the current sink $I_{N2}$ advantageously include internal current mirrors for generating the constant currents. Alternatively, the current sources may be simple current sources employing a voltage source in series with a relatively high impedance in comparison with the impedance of the bias resistors $R_{N1}$ and $R_{N2}$. Preferably, the magnitude of currents $I_{N1}$ and $I_{N2}$ should be approximately equal and should be selected so that the fail safe voltage dropped across the resistors $R_{N1}$ and $R_{N2}$ is greater than the differential voltage necessary for a bus receiver to recognize the differential voltage as a predetermined logic level. In other words, the differential fail safe voltage should be selected to assure that the voltage between the bus lines will cause all differential receivers to detect an unambiguous differential signal. Preferably, $R_{eq}$ is nominally the nominal impedance for the bus. The magnitude of currents $I_{N1}$ and $I_{N2}$ should be sufficient so that the differential voltage across the two resistors $R_{N1}$ and $R_{N2}$ between the two bus lines 20 is greater than the differential voltage threshold needed by receivers on the bus to switch to either an asserted or a deasserted state.

In FIG. 3, as a result of the polarity of fail safe bias voltages at nodes 12 and 14, it may be difficult for the differential amplifier 30 to maintain symmetrical waveforms on the bus without having to source additional current in one of the two swing directions to overcome the fail safe voltage when driving from high to low (or in SCSI, from negated to asserted). In other words, when the differential amplifier 30 is attempting to drive the node 12 relatively low with respect to the node 14, the differential amplifier 30 must first overcome the bias voltage across the resistors $R_{N1}$ and $R_{N2}$. Because the differential amplifier 30 may not be able to sink the additional current in one direction, the signals on the bus lines may be asymmetric. At low data transfer rates, the asymmetry of the bus signals is unlikely to cause problems; however, the asymmetry may not be acceptable at high data transfer rates on the bus.

It has been found to be beneficial to be able to turn off the currents supplied to the resistors in the fail safe bias circuit 100 during high speed data transfers and to turn the currents back on during low speed data transfers such as during message transfers, during control transfers, and when the bus is not being driven by any of the bus transmitters (e.g., by the driver 30). In order to provide the fail safe bias necessary to protect the bus from floating when no drivers are active and to further accommodate high speed data transfers, the Norton equivalent circuit 100 of FIG. 3 is preferably modified as illustrated by a circuit 200 in FIG. 4 by adding switches to control the Norton equivalent current. In particular, a first controlled switch 210 interposed between the current source $I_{N1}$ and the node 12, and a second controlled switch 212 is interposed between the current sink $I_{N2}$ and the second node 14. In preferred embodiments, the switches 210, 212 are metal oxide semiconductor field effect transistors (MOSFETs). The first switch 210 is controlled by a first control signal $C_1$, and the second switch 212 is controlled by a second control signal $C_2$. In the preferred embodiment, the first switch 210 and the second switch 212 are closed when the respective control signals are inactive or unasserted. The control signals $C_1$ and $C_2$ are asserted to open the switches 210, 212 to thereby disconnect the current source $I_{N1}$ and the current sink $I_{N2}$ from the nodes 12 and 14, respectively, during high speed transfers. During slow speed data transfers, such as message and command transfers, and when the bus is idle, the control signals $C_1$ and $C_2$ are unasserted or inactive so that the switches 210 and 212 are closed to provide the current to the resistors $R_{N1}$ and $R_{N2}$ to provide the fail safe bias described above.

Figure 4:
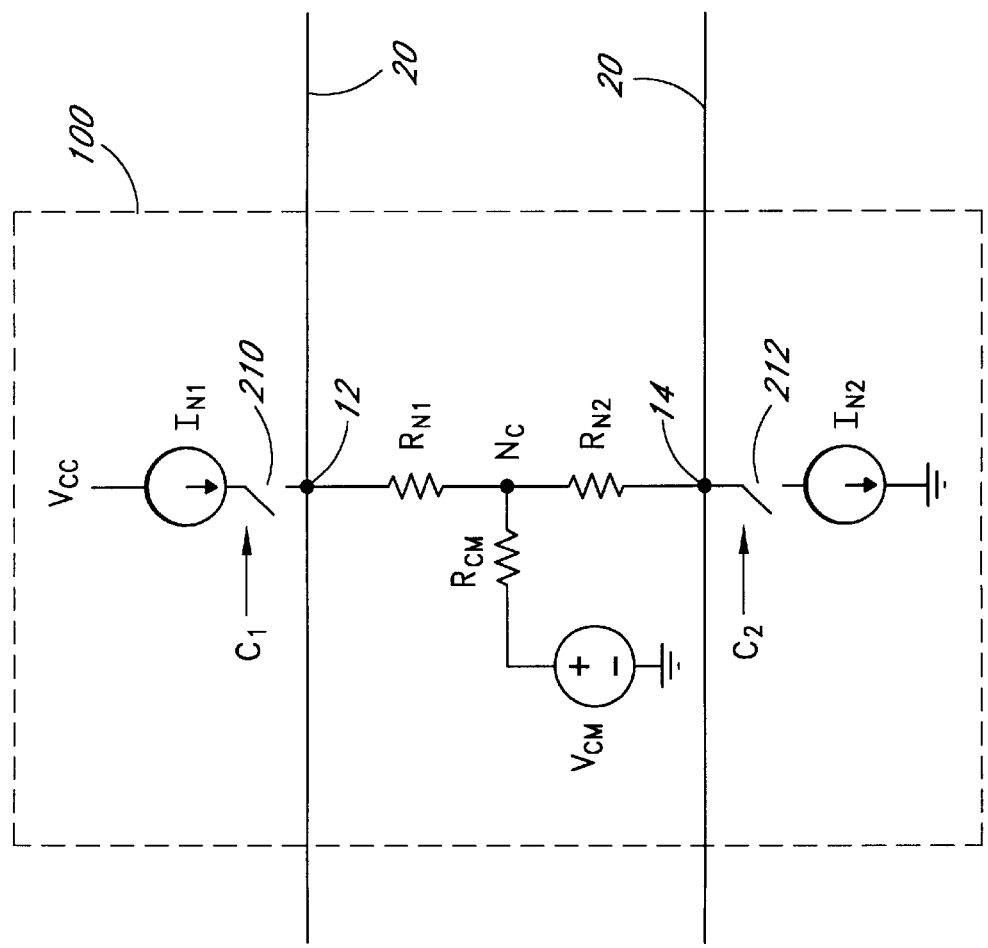
FIG. 4 is a schematic diagram of one embodiment of the Norton implementation which includes switches to selectively couple and uncouple the current source and the current sink from the bus.

The use of the Norton implementation of FIGS. 3 and 4 allows the switches 210 and 212 to be readily incorporated into the circuit. In particular, referring back to FIG. 2, there is no location where the switches 210, 212 can be inserted without degrading the operation of the circuit. In particular, MOSFET switches, such as the switches 210, 212, have a non-zero on-resistance which inserts an additional uncontrolled impedance into the fail safe bias circuit. In the Norton equivalent circuit 200 of FIG. 4, the switches 210, 212 are located outside the bias circuit. Thus, when the switches 210, 212 are off, the fail safe bias circuit reverts to a simple impedance comprising the resistors $R_{N1}$ and $R_{N2}$. When the switches 210, 212 are on, the current from the current source $I_{N1}$ flows through the resistors $R_{N1}$ and $R_{N2}$ to the current sink $I_{N2}$. Because the current from the current source $I_{N1}$ is constant, the additional on-resistances of the switches 210, 212 do not have any significant effect on the operation of the fail safe bias circuit.

The control signals $C_1$ and $C_2$ may be generated in response to any of a number of conditions. For example, when used with an SCSI bus, as described herein, the operation of the SCSI bus is defined by distinct and detectable phases. For example, in a SCSI system which includes arbitration, the phases include a bus free phase during which no device is actively using the bus, an arbitration phase during which one or more devices may arbitrate for control of the bus, a selection or reselection phase during which an initiating device on the bus selects a target, and an information transfer phase during which command, data, status or messages are transferred on the bus. During the bus free stage, which is detectable, for example, when the SCSI bus select (SEL) and busy (BSY) signals have been inactive for at least 400 nanoseconds, no device is driving the line, and it is important to have the currents in the fail safe bias circuit 200 switched on to prevent the lines from floating to unknown levels. During the arbitration and selection (or reselection) phases, the bus is active during at least portions of the phases; however, the signal switching on the lines is relatively slow so that the extra loading of the fail safe bias circuit can be tolerated. Thus, the fail safe bias circuit is preferably switched on during the arbitration and selection (or reselection) phases. During the information transfer phase, data are generally transferred at high data transfer rates. Thus, in order to achieve the highest signal quality, the switches 210, 212 are turned off to inhibit current flow to the resistors $R_{N1}$ and $R_{N2}$. Thus, the signals on the bus can readily switch from one signal level to another without the drivers (e.g., the driver 30) having to switch the additional current from the current source $I_{N1}$. The logic which detects the phases in a conventional SCSI controller can provide an output signal to the control signals $C_1$ and $C_2$ to control the switches 210, 212.

Figure 5:
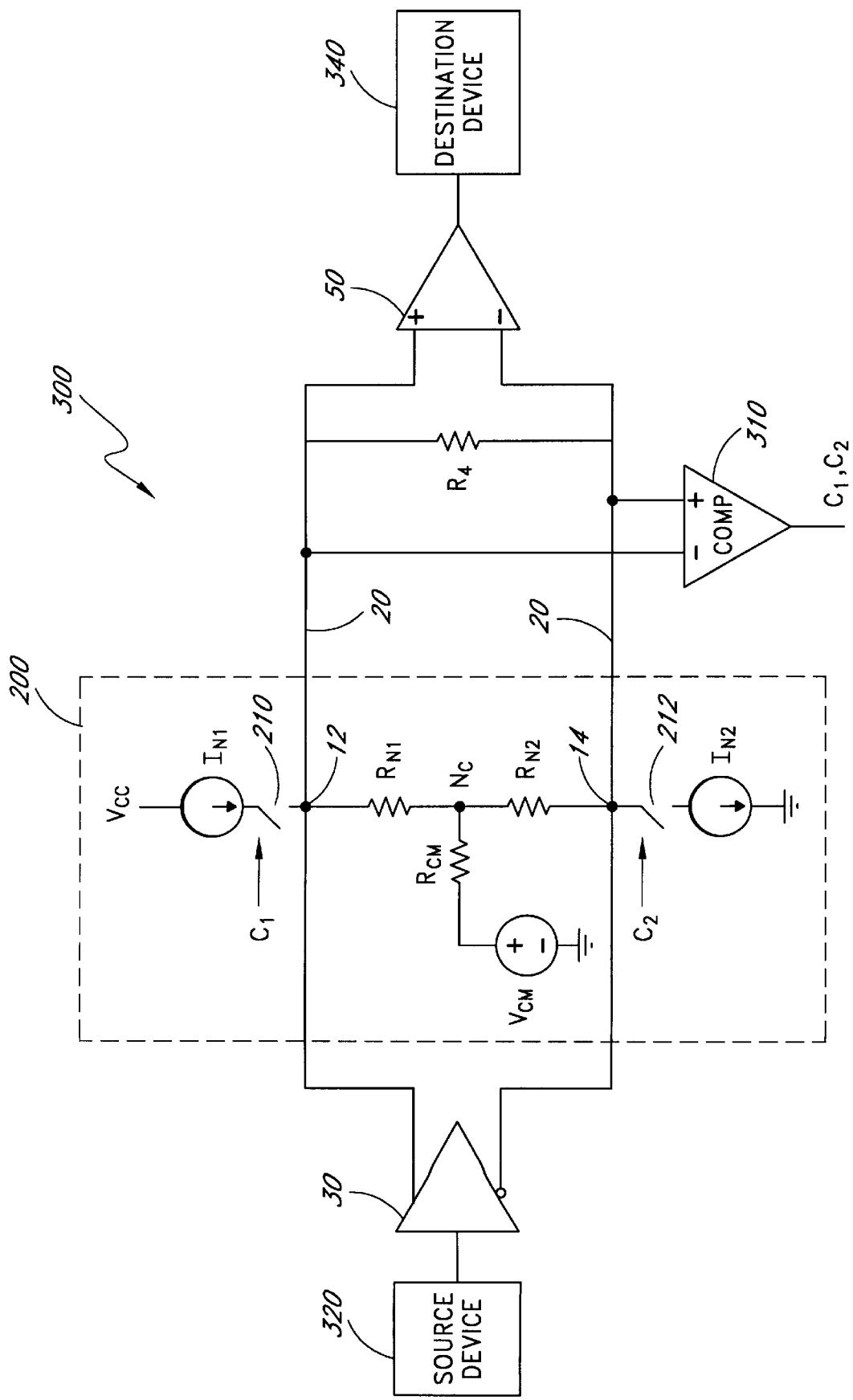
FIG. 5 is a schematic diagram of one embodiment of a fail safe circuit in a bus.

FIG. 5 illustrates an implementation 300 of the fail safe bias circuit 200 in combination with the differential driver 30 and the differential receiver 50 on the bus 20, as described above. Additional drivers 30 and receivers 50 (not shown) are advantageously connected to the bus 20. The differential driver 30 is connected to a source device 320 while the receiver 50 is connected to a destination device 340. The source and destination devices 320, 340 include, but are not limited to computer systems, processors, storage devices such as disk drives and CD-ROMs, sound cards, printers, networking components, additional interface circuitry, or the like.

A comparator 310 is connected across the signal lines of the bus 20 to detect the differential voltage on the bus 20. When the driver 30 and the other drivers (not shown) are all idle (i.e., tri-stated), the switches 210, 212 are closed. When the comparator 310 senses a sufficiently great voltage differential across the bus lines (e.g., a threshold voltage greater than the fail safe bias), the comparator 310 generates the control signals $C_1$ and $C_2$ to turn off the switches 210, 212 so that the current from the current source $I_{N1}$ is no longer applied to the resistors $R_{N1}$ and $R_{N2}$. When the differential voltage across the bus 20 drops below the threshold voltage, the control signals $C_1$ and $C_2$ turn on the switches 210, 212 to provide the fail safe bias. Alternatively, the comparator 310 may be replaced by a frequency detector (not shown) which generates the control signals $C_1$ and $C_2$ to turn off the current flow when high speed data transfers are detected. Alternatively, any device connected to the bus 20 can advantageously generate one or more control signals on one or more bus lines, and the control signals can be logically "or'ed" to control the switches 210, 212.

As discussed above, the bus signal lines 20 represent the signal lines for a single signal in a multiple signal bus. It should be understood from the foregoing, that each control and data line of the SCSI bus (or any other bus to which the present invention is applied) includes its own fail safe bias circuit 200 in accordance with the foregoing description.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A fail safe bias circuit for selectively providing a bias voltage to a bus having a first signal line and a second signal line, said bias circuit comprising:

at least one resistor connected between said first signal line and said second signal line;

a current source;

a first switch interposed between said current source and said first signal line;

a current sink; and a second switch connected between said current sink and said second signal line, said first switch and said second switch operable in respective first states to enable current to flow from said current source via said at least one resistor to said current sink to generate a bias voltage between said first signal line and said second signal line and operable in respective second states to interrupt current flow from said current source through said at least one resistor.

2. The fail safe bias circuit of claim 1, wherein said at least one resistor comprises a first resistor and a second resistor having substantially equal resistances.

3. The fail safe bias circuit of claim 2, wherein said first switch and said second switches are metal oxide semiconductor field effect transistor switches.

4. A fail safe bias circuit which generates a desired bias voltage between a pair of differential signal lines of a bus, said fail safe bias circuit comprising:

at lease one resistance connected between the two signal lines;

a current source which generates a current having a magnitude selected to be substantially equal to the desired bias voltage divided by the at least one resistance;

a current sink which receives the current from said current source via said at icast one resistance;

a first switch disposed between said current source and said at least one resistance; and a second switch disposed between said current sink and said at least one resistance, the first and second switches switching between an on state in which current flows from said current source to said current sink through said at least one resistance and an off state in which said current source and said current sink are disconnected from said at least one resistance, said first switch and said second switch changing from said on state to said off state and from said off state to said on state in response to a control signal.

5. The circuit of claim 4, wherein said control signal is generated by at least one device in response to the transmission rate on the bus.

6. The circuit of claim 4, wherein said control signal is generated by at least one device in response to a differential voltage on said bus.

7. The circuit of claim 4, wherein said control signal is generated by at least one device attached to the bus.

8. The circuit of claim 7, wherein said control signal comprises a logical combination of at least two signals from a plurality of devices secured to the bus.

9. The circuit of claim 8, wherein said signals are generated by respective devices attached to the bus communicating on the bus at a frequency above a threshold.

10. The circuit of claim 8, wherein said signals are generated by respective devices attached to the bus communicating at a frequency below the threshold.

11. An apparatus for selectively providing a bias voltage to a bus having a first signal line and a second signal line, said apparatus comprising:

at least a first switch interposed between a current source and a first signal line; and at least a second switch connected between a current sink and a second signal line, wherein said first and second switches are selectively switched to generate a bias voltage between said first signal line and said second signal line.

12. The apparatus of claim 11 wherein said first and second signal lines operate in at least a first transfer mode and a second transfer mode, said first and second switches configured to generate said bias voltage during said first transfer mode but not during said second transfer mode.

13. The apparatus of claim 12 wherein said first and second signal lines contain one or more control signals and said first transfer mode is configured to transfer said control signals.

14. The apparatus of claim 12 wherein said first and second signal lines comprise a bus.

15. The apparatus of claim 12, wherein said first and second switches are selectively switched to generate a bias voltage between said first signal line and said second signal line based on the transmission rate of said bus.

16. The apparatus of claim 14 wherein said bus is a computer bus.

17. The apparatus of claim 14 wherein said bus is a small computer system interface bus.

18. The apparatus of claim 11 wherein said apparatus further comprises a source device which is connected to said first and second signal lines.

19. The apparatus of claim 18 wherein said source device is a processor.

20. The apparatus of claim 18 wherein said source device is a computer system.

21. The apparatus of claim 18 wherein said source device is a storage device.

22. The apparatus of claim 18 wherein said source device is a printer.

23. The apparatus of claim 18 wherein said source device is network interface circuitry.

24. The apparatus of claim 18 wherein said apparatus further comprises a destination device which is connected to said first and second signal lines.

25. The apparatus of claim 24 wherein said destination device is a processor.

26. The apparatus of claim 24 wherein said destination device is a computer system.

27. The apparatus of claim 24 wherein said destination device is an external storage device.

28. The apparatus of claim 24 wherein said destination device is a printer.

29. The apparatus of claim 24 wherein said destination device comprises network interface circuitry.

30. A method of selectively providing a bias voltage to a bus comprising the acts of:

selectively switching a current source to a first signal line;

selectively switching a current sink to a second signal line, wherein said first and second signal lines operate in at least two transfer modes; and controlling said acts of selectively switching to generate said bias voltage between said first and said second signal lines when no signals exist on said first and second signal lines.

31. The apparatus of claim 30 wherein said act of controlling generates said bias voltage in at least a first transfer mode and does not generate said bias voltage during a second transfer mode.

32. The apparatus of claim 30 wherein said act of controlling generates said bias voltage when control signals exist on said first and second signal lines.

33. The apparatus of claim 30 wherein said act of controlling generates said bias voltage when message signals exist on said first and second signal lines.

34. The apparatus of claim 30 wherein said act of controlling generates said bias voltage when said first and second signal lines are not driven by bus transmitters.

35. The apparatus of claim 30 wherein said act of controlling generates a bias voltage between said first signal line and said second signal line in response to the transmission rate of said signals on said first and second signal lines.

36. The apparatus of claim 30 wherein said act of controlling generates said bias voltage when transmitting said signals to a source device.

37. The apparatus of claim 30 wherein said act of controlling generates said bias voltage when transmitting said signals to a computer processor.

38. The apparatus of claim 30 wherein said act of controlling generates said bias voltage when transmitting said signals to a storage device.

39. The apparatus of claim 30 wherein said act of controlling generates said bias voltage when transmitting said signals to a printer.

40. The apparatus of claim 30 wherein said act of controlling generates said bias voltage when transmitting said signals to a network interface circuitry.

41. The apparatus of claim 30 wherein said act of controlling generates said bias voltage when receiving said signals at a destination device.

42. A fail safe bias circuit which generates a desired bias voltage between a pair of differential signal lines of a bus, said fail safe bias circuit comprising:

at least one resistance connected between the two signal lines;

a current source which generates a current having a magnitude selected to be substantially equal to the desired bias voltage divided by the at least one resistance;

a current sink which receives the current from said current source via said at least one resistance;

a first switch disposed between said current source and said at least one resistance; and a second switch disposed between said current sink and said at least one resistance, the first and second switches switching between an on state in which current flows from said current source to said current sink through said at least one resistance and an off state in which said current source and said current sink are disconnected from said at least one resistance.

* * * * *